United States Patent
Dong et al.

(10) Patent No.: US 12,536,990 B2
(45) Date of Patent: Jan. 27, 2026

(54) MODEL TRAINING METHOD, SPEECH RECOGNITION METHOD, DEVICE, MEDIUM, AND APPARATUS

(71) Applicant: Beijing Youzhuju Network Technology Co., Ltd., Beijing (CN)

(72) Inventors: Linhao Dong, Beijing (CN); Zejun Ma, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 221 days.

(21) Appl. No.: 18/276,769

(22) PCT Filed: May 7, 2022

(86) PCT No.: PCT/CN2022/091480
§ 371 (c)(1),
(2) Date: Aug. 10, 2023

(87) PCT Pub. No.: WO2023/273611
PCT Pub. Date: Jan. 5, 2023

(65) Prior Publication Data
US 2024/0127795 A1    Apr. 18, 2024

(30) Foreign Application Priority Data
Jun. 30, 2021    (CN) .......................... 202110738245.4

(51) Int. Cl.
*G10L 15/065*    (2013.01)
*G10L 15/06*    (2013.01)
*G10L 19/04*    (2013.01)

(52) U.S. Cl.
CPC .......... *G10L 15/063* (2013.01); *G10L 15/065* (2013.01); *G10L 2015/0635* (2013.01); *G10L 19/04* (2013.01)

(58) Field of Classification Search
CPC ........................... G10L 15/063; G10L 15/065
See application file for complete search history.

(56) References Cited

U.S. PATENT DOCUMENTS

| 2017/0221474 A1 | 8/2017 | Hori et al. |
| 2019/0189111 A1 | 6/2019 | Watanabe et al. |

FOREIGN PATENT DOCUMENTS

| CN | 110797016 A | 2/2020 |
| CN | 111199727 A | 5/2020 |

(Continued)

OTHER PUBLICATIONS

Dong, L., & Xu, B. (2020, May). Cif: Continuous integrate-and-fire for end-to-end speech recognition. In ICASSP 2020-2020 IEEE International Conference on Acoustics, Speech and Signal Processing (ICASSP) (pp. 6079-6083). IEEE.*

(Continued)

*Primary Examiner* — Bryan S Blankenagel
(74) *Attorney, Agent, or Firm* — Astute IP Law Group

(57) ABSTRACT

A model training method, a speech recognition method and apparatus, a medium, and a device are provided. The speech recognition model including an encoder, a CIF prediction sub-model and a CTC prediction sub-model. The model training method includes: encoding training speech data based on the encoder to obtain an acoustic vector sequence corresponding to the training speech data; obtaining an information amount sequence corresponding to the training speech data based on the acoustic vector sequence and the CIF prediction sub-model; obtaining a target probability sequence based on the acoustic vector sequence and the CTC prediction sub-model; determining a target loss of the speech recognition model based on the information amount sequence and the target probability sequence; and updating, in response to an updating condition being satisfied, a model (Continued)

parameter of the speech recognition model based on the target loss.

20 Claims, 3 Drawing Sheets

(56) References Cited

FOREIGN PATENT DOCUMENTS

| | | |
|---|---|---|
| CN | 111243576 A | 6/2020 |
| CN | 111916067 A | 11/2020 |
| CN | 112133287 A | 12/2020 |
| CN | 112599117 A | 4/2021 |
| CN | 112634876 A | 4/2021 |
| CN | 113436620 A | 9/2021 |

OTHER PUBLICATIONS

Kim, S., Hori, T., & Watanabe, S. (Mar. 2017). Joint CTC-attention based end-to-end speech recognition using multi-task learning. In 2017 IEEE international conference on acoustics, speech and signal processing (ICASSP) (pp. 4835-4839). IEEE.*

Dong, L., Yi, C., Wang, J., Zhou, S., Xu, S., Jia, X., & Xu, B. (2020). A comparison of label-synchronous and frame-synchronous end-to-end models for speech recognition. arXiv preprint arXiv:2005.10113.*

Zenkel, T., Sanabria, R., Metze, F., Niehues, J., Sperber, M., Stüker, S., & Waibel, A. (2017). Comparison of decoding strategies for ctc acoustic models. arXiv preprint arXiv:1708.04469.*

International Search Report in PCT/CN2022/091480, mailed Jun. 29, 2022, 5 pages.

Notice of Decision of Granting Patent Right for Invention and Search Report in CN202110738245.4, mailed Aug. 4, 2022, 4 pages.

* cited by examiner

MODEL TRAINING METHOD, SPEECH RECOGNITION METHOD, DEVICE, MEDIUM, AND APPARATUS

CROSS-REFERENCE TO RELATED APPLICATIONS

This is a national stage application filed under 37 U.S.C. 371 of International Patent Application No. PCT/CN2022/091480, filed May 7, 2022, which claims priority to Chinese Patent Application No. 202110738245.4, filed on Jun. 30, 2021, entitled "MODEL TRAINING METHOD, SPEECH RECOGNITION METHOD, DEVICE, MEDIUM, AND APPARATUS", the disclosures of which are incorporated herein by reference in their entireties.

TECHNICAL FIELD

The present disclosure relates to the field of computer technology, and more particularly, to a method for training a model, a method for speech recognition, a device, a medium and an apparatus.

BACKGROUND

With the rise of in-depth learning, a variety of end-to-end modeling methods relying entirely on neural networks have emerged. In performing speech recognition, since lengths of input speech data and output text data are different, the speech recognition can be performed by performing a sequence alignment and mapping through an alignment algorithm. In the related art, in order to improve an accuracy of a speech recognition model, a multi-task learning method is usually used to train the model. However, in the related art, usually prediction knowledge based on an alignment algorithm acts on an encoding module, the learned knowledge can only be applied in the process of encoding data, and it is difficult to realize a comprehensive application of the multi-task learning knowledge, thus affecting the training efficiency of the speech recognition model.

SUMMARY

This disclosure is provided to introduce a selection of concepts in a simplified form that are further described below in the Detailed Description. This disclosure is not intended to identify key features or essential features of the claimed technology, nor is it intended to limit the scope of the claimed technology.

In a first aspect, the present disclosure provides a method for training a speech recognition model. The speech recognition model including an encoder, a Continuous Integrate-and-Fire (CIF) prediction sub-model and a Connectionist temporal classification (CTC) prediction sub-model. The method includes:
- encoding training speech data based on the encoder to obtain an acoustic vector sequence corresponding to the training speech data, the acoustic vector sequence including an acoustic vector of each audio frame of the training speech data;
- obtaining an information amount sequence corresponding to the training speech data based on the acoustic vector sequence and the CIF prediction sub-model, the information amount sequence containing a target information amount of each audio frame;
- obtaining a target probability sequence based on the acoustic vector sequence and the CTC prediction sub-model, the target probability sequence includes a target text probability corresponding to each audio frame;
- determining a target loss of the speech recognition model based on the information amount sequence and the target probability sequence; and
- updating, in response to an updating condition being satisfied, a model parameter of the speech recognition model based on the target loss.

Optionally, the obtaining the information amount sequence corresponding to the training speech data based on the acoustic vector sequence and the CIF prediction sub-model includes:
- inputting the acoustic vector sequence into the CIF prediction sub-model to obtain a predictive information amount sequence, the predictive information amount sequence including a predictive information amount corresponding to each audio frame; and
- normalizing the predictive information amount corresponding to each audio frame in the predictive information amount sequence to obtain a target information amount corresponding to each audio frame so as to obtain the information amount sequence.

Optionally, the obtaining obtaining the target probability sequence based on the acoustic vector sequence and the CTC prediction sub-model includes:
- inputting the acoustic vector sequence into the CTC prediction sub-model to obtain a predictive probability distribution corresponding to each audio frame;
- determining, for each audio frame, a sum of probabilities corresponding to a target character in the predictive probability distribution corresponding to the audio frame as a text probability of the audio frame; and
- normalizing the text probability corresponding to each audio frame to obtain a target text probability corresponding to the audio frame so as to obtain the target probability sequence.

Optionally, the determining the target loss of the speech recognition model based on the information amount sequence and the target probability sequence includes:
- determining a distance loss corresponding to the speech recognition model based on a target distance between the information amount sequence and the target probability sequence; and
- determining the target loss based on the distance loss and a predictive loss of the speech recognition model, wherein the predictive loss includes one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

Optionally, the determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;
$P_u$ represents a target text probability corresponding to a $u^{th}$ audio frame;

$α_u$ represents the target information amount corresponding to the $u^{th}$ audio frame.

In a second aspect, a speech recognition method is provided. The speech recognition method includes:

receiving speech data to be recognized; and inputting the speech data into a speech recognition model to obtain a target text corresponding to the speech data, wherein the speech recognition model is obtained by being trained based on the method for training the speech recognition model according to any embodiment of the first aspect.

According to a third aspect, a device for training a speech recognition model is provided. The speech recognition model includes an encoder, a Continuous Integrate-and-Fire (CIF) prediction sub-model and a Connectionist temporal classification (CTC) prediction sub-model. The device includes:

an encoding module configured to encode training speech data based on the encoder to obtain an acoustic vector sequence corresponding to the training speech data, the acoustic vector sequence including an acoustic vector of each audio frame of the training speech data;

a first processing module configured to obtain an information amount sequence corresponding to the training speech data based on the acoustic vector sequence and the CIF prediction sub-model, the information amount sequence containing a target information amount of each audio frame;

a second processing module configured to obtain a target probability sequence based on the acoustic vector sequence and the CTC prediction sub-model, wherein the target probability sequence includes a target text probability corresponding to each audio frame;

a first determination module configured to determine a target loss of the speech recognition model based on the information amount sequence and the target probability sequence; and an updating module configured to update, in response to an updating condition being satisfied, a model parameter of the speech recognition model based on the target loss.

According to a fourth aspect, a speech recognition device is provided. The speech recognition device includes:

a receiving module configured to receive speech data to be recognized;

a second determination module configured to determine a target text corresponding to the speech data based on the speech data and a speech recognition model, wherein the speech recognition model is obtained by being trained based on the method for training the speech recognition model according to any embodiment of the first aspect.

According to a fifth aspect, a computer readable medium is provided. The computer readable medium has stored thereon a computer program which, when executed by a processing means, implements steps of the method of any embodiment of the first or second aspects.

According to a sixth aspect, an electronic device is provided. The electronic device includes:

a storage device on which a computer program is stored; and a processing device configured to execute the computer program in the storage device to implements steps of the method according to any embodiment of the first or second aspects.

In the above-mentioned technical solution, the training speech data can be encoded according to the encoder to obtain an acoustic vector sequence corresponding to the training speech data, and then an information amount sequence corresponding to the training speech data can be obtained based on the acoustic vector sequence and the CIF prediction sub-model, a target probability sequence can be obtained based on the acoustic vector sequence and the CTC prediction sub-model, a target loss of the speech recognition model is thus determined based on the information amount sequence and the target probability sequence, such that a model parameter of the speech recognition model is updated based on the target loss under the condition that an updating condition is satisfied. Thus, with the above-mentioned technical solution, in the process of training a speech recognition model, not only the multi-task learning knowledge can be applied to the speech recognition model, but also the consistency between the information amount sequence and the target probability sequence predicted by a plurality of prediction sub-models can be directly determined, so that the accuracy of the model loss can be ensured, and the comprehensive application of the multi-task learning knowledge can be realized, so that the model parameters can be adjusted based on the accurate loss. In this way, the accuracy of model updating can be improved, and the training efficiency and accuracy of the speech recognition model can be ensured. In addition, the accuracy of the trained speech recognition model can be improved to some extent and the user experience can be improved.

Additional features and advantages of the application will be described in detail in the detailed description below.

BRIEF DESCRIPTION OF DRAWINGS

The above and other features, advantages, and aspects of embodiments of the present disclosure will become more apparent with reference to the following detailed description when taken in conjunction with the accompanying drawings. Throughout the drawings, same or similar reference numerals indicate same or similar elements. It should be understood that the drawings are diagrammatic and that the components and elements are not necessarily drawn to scale. In the drawings.

DESCRIPTION OF EMBODIMENTS

Embodiments of the present disclosure will be described in more detail with reference to the accompanying drawings. While certain embodiments of the present disclosure have been illustrated in the accompanying drawings, it is to be understood that the present disclosure may be embodied in various forms and should not be construed as limited to the embodiments set forth herein. Rather, these embodiments are provided so that the present disclosure will be thorough and complete. It should be understood that the drawings and examples of the present disclosure are for illustrative purposes only and are not intended to limit the scope of the present disclosure.

It should be understood that the various steps recited in the method embodiments of the present disclosure may be performed in different orders and/or in parallel. Moreover, in the method embodiments, additional steps may be included and/or performance of the steps shown may be omitted. The scope of the present disclosure is not limited in this respect.

As used herein, the term "include" and variations thereof as used herein are open-ended, i.e., "including, but not limited to". The term "based on" is "based on at least in part". The term "one embodiment" means "at least one embodiment". The term "another embodiment" means "at least one further embodiment". The term "some embodiments" means "at least some embodiments". Relevant definitions of other terms will be given in the following description.

It should be noted that references to "first", "second", and the like in this disclosure are merely used to distinguish between different devices, modules, or units and are not intended to limit the order or interdependence of the functions performed by the devices, modules, or units.

It is noted that the references to "a", "an" and "a plurality of" in this disclosure are intended to be illustrative and not limiting. A person skilled in the art will understand that "a", "an" and "a plurality of" are to be interpreted as "one or more" unless the context clearly dictates otherwise.

The names of interactive messages or information between devices in embodiments of the present disclosure are for illustrative purposes only and are not intended to limit the scope of such messages or information.

Figure 1:
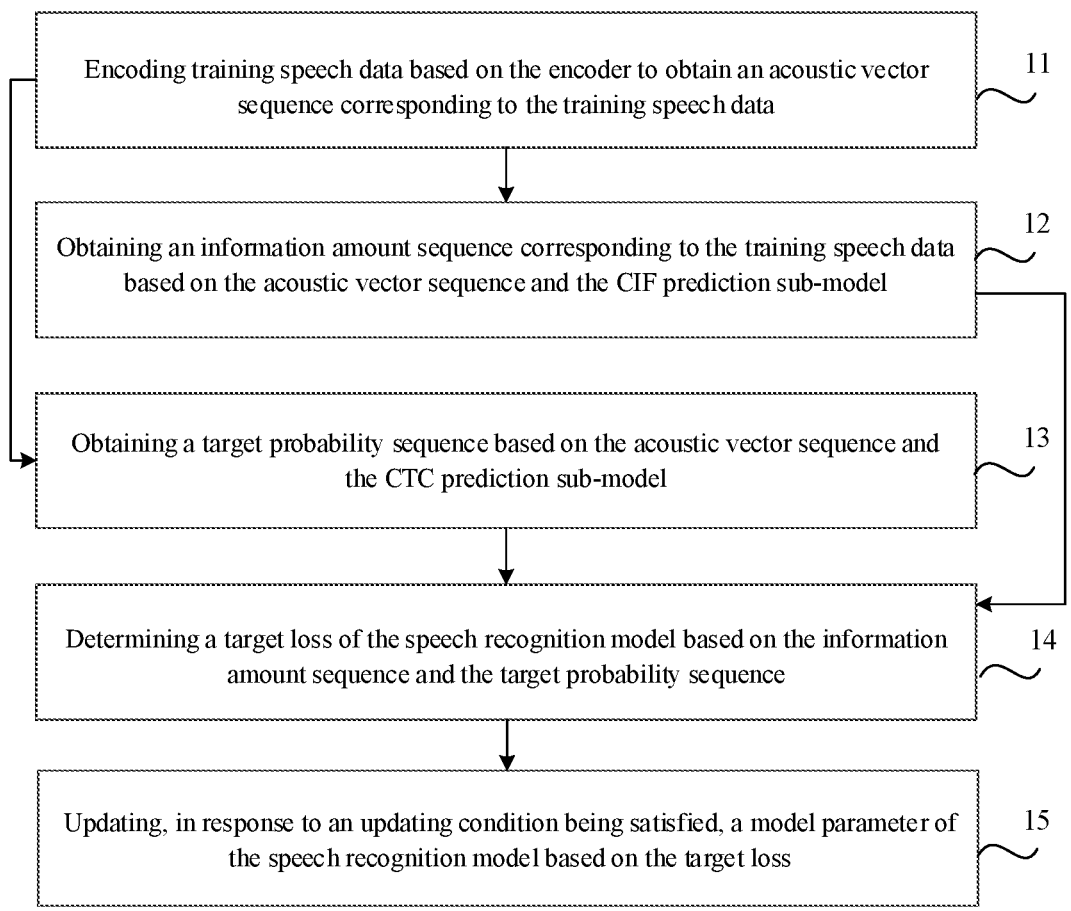
FIG. 1 is a flow diagram of a method for training a speech recognition model according to an embodiment of the present disclosure.

FIG. 1 is a flowchart of a method for training a speech recognition model according to an embodiment of the present disclosure. The speech recognition model may include an encoder, a Continuous Integrate-and-Fire (CIF) prediction sub-model, and a Connectionist Temporal Classification (CTC) prediction sub-model. The method may include steps 11 to 15.

At step 11, training speech data is encoded based on the encoder to obtain an acoustic vector sequence corresponding to the training speech data. The acoustic vector sequence includes an acoustic vector of each audio frame of the training speech data.

Typically, the speech data per second may be sliced into a plurality of audio frames, so that data processing is performed on the basis of the audio frames. For example, the speech data per second may be sliced into 100 audio frames for processing. Accordingly, an acoustic vector sequence H obtained by encoding the audio frames of the training speech data based on the encoder can be represented as:

H:{$H_1, H_2, \ldots, H_U$}, where U denotes the number of audio frames from the beginning of speech to the end of speech that are in the training speech data, i.e. a length of the acoustic vector sequence.

At step 12, an information amount sequence corresponding to the training speech data is obtained based on the acoustic vector sequence and the CIF prediction sub-model. The information amount sequence contains a target information amount of each audio frame.

Here, as described above, the speech data per second is sliced into 100 audio frames to be processed, and an information amount corresponding to each audio frame may characterize the amount of information contained in the audio frame.

By way of example, the CIF prediction sub-model may include a one-dimensional convolution layer, a fully connected layer and an output unit. Regarding calculating the information amount corresponding to the acoustic vector of each audio frame in the acoustic vector sequence, a window centered on the acoustic vector Hu of the audio frame may be input to the one-dimensional convolution layer and then input to the fully connected layer activated by sigmoid, and then input to the output unit so as to obtain information amount Wu of the audio frame. In this way, the information amount sequence can be obtained.

At step 13, a target probability sequence is obtained based on the acoustic vector sequence and the CTC prediction sub-model. The target probability sequence includes a target text probability corresponding to each audio frame.

Here, the CTC model can be understood as a neural network-based temporal classification. In the CTC prediction sub-model, a text sequence of an arbitrary length can be determined for an acoustic vector sequence of a given length. Furthermore, in the CTC prediction sub-model, for an input acoustic vector sequence, an alignment sequence that is of a same length as that of the input acoustic vector sequence is present, and the input acoustic vector sequence is mapped to a text sequence through the alignment sequence. Accordingly, in embodiments of the present disclosure, prior to the acoustic vector sequence is mapped to a alignment sequence, a probability distribution of the acoustic vector sequence in each dimension can be determined as a predictive probability distribution of an audio frame in the dimension, and thus the target text probability may be determined based on the predictive probability distribution.

In order to ensure the accuracy of merging consecutive characters that are identical when outputting a text sequence from an alignment sequence, a null character is introduced in the CTC model, and the null character has no meaning and is removed when it is mapped to an output text sequence. When merging repeated characters in the CTC model, consecutive and repeated characters between the null characters are merged, and repeated characters separated by the null character are not merged, thereby ensuring the accuracy of recognized text obtained by speech recognition.

The distribution of probabilities for each audio frame corresponding to a plurality of recognized characters, including a plurality of real characters and a null character, can be determined in a probabilistic prediction in the CTC model.

At step 14, a target loss of a speech recognition model is determined based on the information amount sequence and the target probability sequence.

The information amount of each audio frame in the information amount sequence can characterize the amount of information contained in the audio frame, and the target text probability distribution corresponding to each audio frame in the target probability sequence includes a probability corresponding to a real character. For each audio frame, the amount of information contained in the audio frame should be large if the probability of a corresponding real character in the audio frame is large, and the amount of information contained in the audio frame should be small if the probability of a corresponding null character in the audio frame is large. Therefore, according to the embodiment of the present disclosure, the loss calculation based on the information amount sequence and the target probability sequence can characterize an relationship between the information amount sequence and the target probability sequence so as to ensure the matching between the information amount sequence and the target probability sequence to some extent.

At step 15, in response to an updating condition being satisfied, a model parameter of the speech recognition model is updated based on the target loss.

As an example, the updating condition may be that the target loss is greater than a preset loss threshold, which indicates an insufficient recognition accuracy of the speech recognition model. As another example, the updating condition may be that the number of iterations is less than a preset number threshold, at which point the speech recognition model is considered to have fewer iterations and an insufficient recognition accuracy. Accordingly, if the updating condition is satisfied, a model parameter of the speech recognition model, such as a parameter of the encoder, a parameter of the CIF prediction sub-model and a parameter of the CTC prediction sub-model in the speech recognition model can be updated based on the target loss. The method for updating the model parameters based on the determined loss may adopt an updating manner commonly used in the art, and the description thereof will be omitted here.

when the updating condition is not satisfied, it can be considered that the recognition accuracy of the speech recognition model meets a training requirement, and at this time, the training process can stop to obtain the trained speech recognition model.

In the above-mentioned technical solution, the training speech data can be encoded based on the encoder to obtain an acoustic vector sequence corresponding to the training speech data, and then an information amount sequence corresponding to the training speech data can be obtained based on the acoustic vector sequence and the CIF prediction sub-model, a target probability sequence can be obtained based on the acoustic vector sequence and the CTC prediction sub-model, a target loss of the speech recognition model is thus determined based on the information amount sequence and the target probability sequence, such that a model parameter of the speech recognition model is updated based on the target loss under the condition that an updating condition is satisfied. Thus, with the above-mentioned technical solution, in the process of training a speech recognition model, not only the multi-task learning knowledge can be applied to the speech recognition model, but also the consistency between the information amount sequence and the target probability sequence predicted by a plurality of prediction sub-models can be directly determined, so that the accuracy of the model loss can be ensured, and the comprehensive application of the multi-task learning knowledge can be realized, so that the model parameters can be adjusted based on the accurate loss. In this way, the accuracy of model updating can be improved, and the training efficiency and accuracy of the speech recognition model can be ensured. In addition, the accuracy of the trained speech recognition model can be improved to some extent and the user experience can be improved.

In a possible embodiment, in step 12, an exemplary implementation of obtaining the information amount sequence corresponding to the training speech data based on the acoustic vector sequence and the CIF prediction sub-model may include:

inputting the acoustic vector sequence into the CIF prediction sub-model to obtain a predictive information amount sequence, the predictive information amount sequence including a predictive information amount corresponding to each audio frame.

As described above, the information amount output by the CIF prediction sub-model can be taken as the predictive information amount, so that the predictive information amount sequence can be quickly obtained based on the CIF prediction sub-model. The manner in which the information amount of the input sequence is determined based on the CIF prediction sub-model has been described in detail above.

Then, the predictive information amount corresponding to each audio frame in the predictive information amount sequence is normalized to obtain a target information amount corresponding to each audio frame so as to obtain the information amount sequence.

According to an embodiment of the present disclosure, considering for the same speech data that, the information amount corresponding to each audio frame thereof and the probability corresponding to a real tag in each audio frame should be positively correlated. In order to explicitly construct the relationship between the information amount sequence and the target probability sequence, the predictive information amount corresponding to each audio frame in the output predictive information amount sequence can be normalized to reflect the relationship between various information amounts in the information amount sequence under a same standard so as to facilitate the accuracy of subsequent determination of the target loss, thereby providing effective data support for subsequent accurate loss calculation.

In one possible embodiment, an exemplary implementation way of obtaining the target probability sequence based on the acoustic vector sequence and the CTC prediction sub-model in step 13 may include:

inputting the acoustic vector sequence into the CTC prediction sub-model to obtain a predictive probability distribution corresponding to each audio frame.

Illustratively, the predictive probability distribution for an audio frame can be expressed as $\{\in:p_1;s_1:p_2;s_2:p_3;\,,\,,\,;s_{n-1}:p_n\}$. An accumulated sum of $p_1, p_2$ to $p_n$ is 1, and each audio frame corresponds to n character dimensions, and the n characters includes a null character $\in$ and n−1 real characters.

For each audio frame, a sum of probabilities corresponding to a target character in the predictive probability distribution corresponding to the audio frame is determined as a text probability of the audio frame.

As described above, a predictive probability for a null character is present in the probability distribution for each audio frame of the CTC model, and the null character has no practical meaning. Thus, in an embodiment of the present disclosure, the target character may be a real character as described above. In the process of determining the target probability sequence for comparison with the information amount sequence, a sum of probabilities for all real characters in each audio frame is used as the text probability for the audio frame, so as to characterize the probability corresponding to the real characters for the audio frame.

The text probability corresponding to each audio frame is normalized to obtain a target text probability corresponding to the audio frame so as to obtain the target probability sequence.

Likewise, for each audio frame, after the text probability of each audio frame is determined, the probability magnitudes corresponding to respective audio frames will be different. In this embodiment, in order to ensure the comprehensive consideration and unified standard of the text probability corresponding to each audio frame, the text probability corresponding to each audio frame can be normalized to obtain the target text probability corresponding to the audio frame, and thus the relationships among respective text probabilities in the target probability sequence can be reflected under the same standard, so as to facilitate the accuracy of subsequent determination of the target loss, and to provide effective data support for subsequent accurate loss calculation.

In one possible embodiment, an exemplary implementation of determining the target loss of the speech recognition model based on the information amount sequence and the target probability sequence in step 14 may include:

determining a distance loss corresponding to the speech recognition model based on a target distance between the information amount sequence and the target probability sequence.

As an example, after determining the information amount sequence and the target probability sequence, a Mean Square Error (MSE) between the information amount sequence and the target probability sequence can be calculated as the distance loss. As another example, the Euclidean distance between the information amount sequence and the target probability sequence can also be calculated as the distance loss.

As another example, the determining the distance loss corresponding to the speech recognition model based on the target distance between the information amount sequence and the target probability sequence can be performed by a formula of:

$$L_{KL} = \sum_u P_u * \log(P_u/\alpha_u)$$

where $L_{KL}$ represents the distance loss;
$P_u$ represents a target text probability corresponding to a $u^{th}$ audio frame;
$\alpha_u$ represents a target information amount corresponding to the $u^{th}$ audio frame.

A KL distance between the information amount sequence and the target probability sequence can be determined by the above formula. The KL distance is the Kullback-Leibler difference, also known as the relative Relative Entropy, which can be used to measure the difference of two probability distributions in the same event space. When the two probability distributions are identical, the relative entropy is 0, i.e. the KL distance is zero. Therefore, in the embodiments of the present disclosure, the model parameters can be updated by using the KL distance between the information amount sequence and the target probability sequence as one of losses of the model, so that the model can be adjusted to make the distance between the information amount sequence and the target probability sequence is closer, i.e. the probability distributions corresponding to the information amount sequence and the target probability sequence are closer and more consistent, thereby ensuring the accuracy of the parameter update of the speech recognition model and improving the efficiency and accuracy of training the speech recognition model.

The target loss is determined based on the distance loss and a predictive loss of the speech recognition model. The predictive loss includes one or more of a number loss and a cross entropy loss corresponding to the CIF prediction sub-model and a alignment loss corresponding to the CTC model. The number loss corresponding to the CIF prediction sub-model is determined based on a number of predictive characters output by the CIF prediction sub-model and a number of characters of a training text corresponding to the training speech data.

The cross entropy loss corresponding to the CIF prediction sub-model can be CE Loss, and the alignment loss corresponding to the CTC model can be CTC loss. The calculation methods of CE Loss and CTC loss are common calculation methods in the art, and details thereof will be omitted here.

In the CIF prediction sub-model, the information amount corresponding to each predictive character is the same by default. Therefore, according to an embodiment of the present disclosure, the information amounts in an information amount sequence corresponding to audio frames can be accumulated from left to right, and when an accumulated sum of the information amounts is equal to a pre-set threshold value, one or more audio frames corresponding to the accumulated sum is considered to form as a predictive character, and one predictive character corresponds to one or more audio frames. The preset threshold value can be set according to practical application scenarios and experiences, and the preset threshold value can be set as 1 by way of example, which is not limited in the present disclosure.

In a possible embodiment, the acoustic vectors of the audio frames in the acoustic vector sequence may be combined based on the information amount sequence by:
sequentially acquiring an information amount Wi of an audio frame i according to a sequence order in the information amount sequence;
if Wi is less than a pre-set threshold value β, acquiring a next audio frame as a current audio frame, i.e. i=i+1, and accumulating the information amounts of the traversed audio frames to obtain an accumulated sum; and
if the accumulated sum is greater than the pre-set threshold value, determining that a character boundary occurs, i.e., a part of the currently traversed audio frames belongs to a current predictive character, and the other part of the currently traversed audio frames belongs to a next predictive character.

Illustratively, if W1+W2 is greater than β, it may be determined that a character boundary occurs, i.e. the first audio frame and a part of the second audio frame may correspond to a predictive character, and the boundary of the predictive character is in the second audio frame. At this time, the information amount of the second audio frame can be divided into two parts, i.e., a part of the information amount belongs to the current predictive character, and the remaining part of the information amount belongs to the next predictive character.

Accordingly, an information amount W21 belonging to the current predictive character in the information amount W2 of the second audio frame can be expressed as: W21=β−W1, and the amount of information W22 belonging to the next predictive character can be expressed as W22=W2−W21.

Then it continues to traverse the information amounts of the audio frames. Specifically, it continues to accumulate the information amounts from the information amount of the remaining part of the second audio frame, i.e. it continues to add the information amount W22 in the second audio frame with an information amount W3 in the third audio frame until the accumulated value reaches the preset threshold β, so as to obtain audio frames corresponding to the next predictive character. By parity of reasoning with regard to the information amounts of subsequent audio frames, a combination is performed in the above-mentioned manner to obtain various predictive characters corresponding to multiple audio frames.

Based on this, after determining the correspondence between a predictive character and an audio frame in the speech data, for each predictive character, a weighted sum of acoustic vectors for each audio frame to which the predictive character corresponds may be determined as the acoustic vector to which the predictive character corresponds. The weight of the acoustic vector of each audio frame corresponding to the predictive character is the information amount corresponding to the audio frame in the predictive character. If an audio frame entirely belongs to the predictive character, the weight of the acoustic vector of the audio frame is the information amount of the audio frame. If a part of an audio frame belongs to the predictive character, the weight of the acoustic vector of the audio frame is an information amount of the part of the audio frame. Thereafter, a real character to which each predictive character corresponds may be determined based on the acoustic vector to which the predictive character corresponds.

Therefore, according to the embodiment, the difference between the number of predictive characters determined in the above-mentioned process and the number of real characters in the target text corresponding to the training speech data can be determined as the number loss corresponding to the CIF prediction sub-model.

In summary, when the target loss is determined based on the distance loss and the predictive loss of the speech recognition model after the above-mentioned losses are respectively determined, the determined losses may be weighted and summed, wherein the predictive loss for calculation and the weight corresponding to each predictive loss may be preset, so that after the predictive loss is determined, the weighted sum of the predictive loss and the distance loss is determined as the target loss.

Thus, by means of the above-mentioned technical solution, the target loss can include a distance loss characterizing the the probability distribution difference between the information amount sequence and the target probability sequence, which at the same time can be combined with the loss of the CIF sub-model and the loss of the CTC prediction sub-model, so that the determined target loss can characterize a more comprehensive loss in the speech recognition model, and thus the speech recognition model can be updated based on an accurate target loss to improve the training efficiency and accuracy of the speech recognition model and improve the user experience.

The present disclosure further provides a speech recognition method that may include:
  receiving speech data to be recognized; and
  inputting the speech data into a speech recognition model to obtain a target text corresponding to the speech data, wherein the speech recognition model is obtained by being trained based on the method for training the speech recognition model according to any of the above embodiments.

With the above-mentioned technical solution, in the training process of a speech recognition model, the multi-task learning knowledge can be applied to the speech recognition model, the target loss of the model is determined based on the information amount of each audio frame in the training speech data and the probability distribution of an audio frame to a recognition character, the accuracy of the loss of the model can be the model can be ensured, and the comprehensive application of the multi-task learning knowledge can be realized, so that the model parameters can be adjusted based on the accurate loss, the accuracy of the model updating can be improved, and the training efficiency and accuracy of the speech recognition model can be ensured. Further, the accuracy of the trained speech recognition model can be improved to some extent, so that the accuracy of the recognized target text can be effectively improved and the user experience can be improved.

Figure 2:
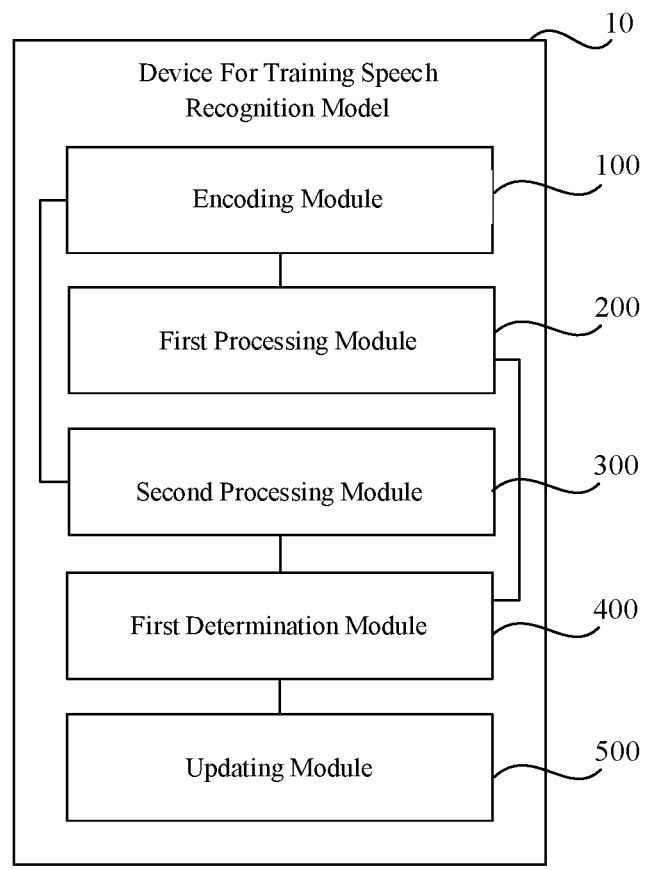
FIG. 2 is a block diagram of a device for training a speech recognition model according to an embodiment of the present disclosure.

The present disclosure further provides a device for training a speech recognition model. The speech recognition model includes an encoder, a CIF prediction sub-model and a CTC prediction sub-model. As shown in FIG. 2, the device 10 includes an encoding module 100, a first processing module 200, a second processing module 300, a first determination module 400 and an updating module 500.

The encoding module 100 is configured to encode training speech data based on the encoder to obtain an acoustic vector sequence corresponding to the training speech data. The acoustic vector sequence includes an acoustic vector of each audio frame of the training speech data.

The first processing module 200 is configured to obtain an information amount sequence corresponding to the training speech data based on the acoustic vector sequence and the CIF prediction sub-model. The information amount sequence contains a target information amount of each audio frame.

The second processing module 300 is configured to obtain a target probability sequence based on the acoustic vector sequence and the CTC prediction sub-model. The target probability sequence includes a target text probability corresponding to each audio frame.

The first determination module 400 is configured to determine a target loss of the speech recognition model based on the information amount sequence and the target probability sequence.

The updating module 500 is configured to update, in response to an updating condition being satisfied, a model parameter of the speech recognition model based on the target loss.

Optionally, the first processing module includes a first input sub-module and a first processing sub-module.

The first input sub-module is configured to input the acoustic vector sequence into the CIF prediction sub-model to obtain a predictive information amount sequence. The predictive information amount sequence includes a predictive information amount corresponding to each audio frame.

The first processing sub-module is configured to normalize the predictive information amount corresponding to each audio frame in the predictive information amount sequence to obtain a target information amount corresponding to each audio frame so as to obtain the information amount sequence.

Optionally, the second processing module includes a second input sub-module, a first determination sub-module and a second processing sub-module.

The second input sub-module is configured to input the acoustic vector sequence into the CTC prediction sub-model to obtain a predictive probability distribution corresponding to each audio frame;

The first determination sub-module is configured to determine, for each audio frame, a sum of probabilities corresponding to a target character in the predictive probability distribution corresponding to the audio frame as a text probability of the audio frame.

The second processing sub-module is configured to normalize the text probability corresponding to each audio frame to obtain a target text probability corresponding to the audio frame so as to obtain the target probability sequence.

Optionally, the determination module includes a second determination sub-module and a third determination sub-module.

The second determination sub-module is configured to determine a distance loss corresponding to the speech recognition model based on a target distance between the information amount sequence and the target probability sequence.

The third determination sub-module is configured to determine the target loss based on the distance loss and a predictive loss of the speech recognition model. The predictive loss includes one or more of a number loss and a cross entropy loss that correspond to the CIF prediction sub-model and an alignment loss corresponding to the CTC prediction sub-model. The number loss corresponding to the CIF prediction sub-model is determined based on a number of predictive characters output by the CIF prediction sub-model and a number of characters of a training text corresponding to the training speech data.

Optionally, The determining the distance loss corresponding to the speech recognition model based on the target distance between the information amount sequence and the target probability sequence is performed by a formula of:

$$L_{KL} = \sum_{u} P_u * \log(P_u/\alpha_u)$$

where $L_{KL}$ represents the distance loss;
$P_u$ represents a target text probability corresponding to a $u^{th}$ audio frame;
$\alpha_u$ represents a target information amount corresponding to the $u^{th}$ audio frame.

The present disclosure further provides a speech recognition device. The speech recognition device includes a receiving module and a second determination module.

The receiving module is configured to receive speech data to be recognized.

The second determination module is configured to determine a target text corresponding to the speech data based on the speech data and a speech recognition model, wherein the speech recognition model is obtained by being trained based on the method for training the speech recognition model according to any of the above methods.

Figure 3:
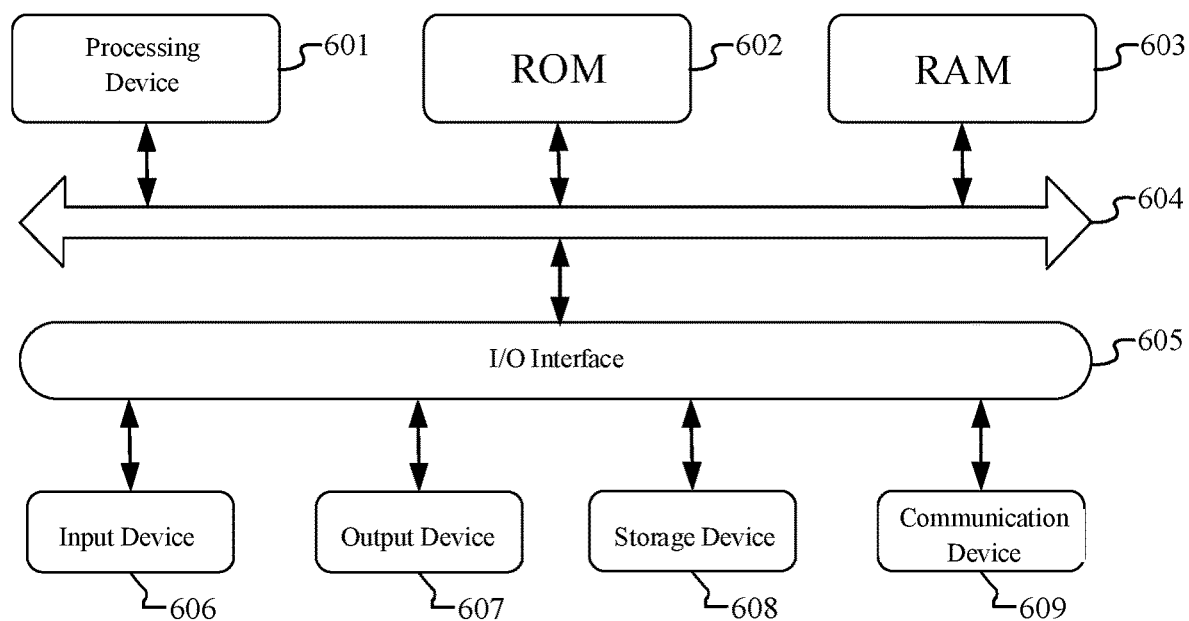
FIG. 3 is a block diagram illustrating a structure of an electronic device suitable for implementing embodiments of the present disclosure.

Reference is now made to FIG. 3, which illustrates a schematic block diagram of an electronic device 600 suitable for implementing embodiments of the present disclosure. Terminal devices in embodiments of the present disclosure may include, but are not limited to, mobile terminals such as mobile phones, notebook computers, digital broadcast receivers, personal digital assistants (PDAs), tablet computers (PADs), portable multimedia players (PMPs), in-vehicle terminals (e.g. in-vehicle navigation terminals, etc.), and fixed terminals such as digital TVs, desktop computers, etc. The electronic device shown in FIG. 3 is only one example and should not impose any limitation on the functionality and scope of use of the disclosed embodiments.

As shown in FIG. 3, the electronic device 600 may include a processing device (e.g. a central processor, graphics processor, etc.) 601 that may perform various suitable actions and processes according to a program stored in a read only memory (ROM) 602 or a program loaded from a storage device 608 into a random access memory (RAM) 603. In the RAM 603, various programs and data required for the operation of the electronic device 600 are also stored. The processing device 601, the ROM 602 and the RAM 603 are connected to each other via a bus 604. An input/output (I/O) interface 605 is also connected to the bus 604.

In general, the following apparatuses may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, etc.; a storage device 608 including, for example, a magnetic tape, a hard disk, etc.; and a communication device 609. The communication device 609 can allow the electronic device 600 to communicate with other devices in a wireless or wired way to exchange data. Although FIG. 3 illustrates an electronic device 600 having various apparatuses, it should be understood that not all illustrated apparatuses are required to be implemented or provided. More or fewer apparatuses may alternatively be implemented or provided.

In particular, processes described above with reference to flow diagrams may be implemented as computer software programs according to embodiments of the present disclosure. For example, embodiments of the present disclosure include a computer program product including a computer program embodied on a non-transitory computer-readable medium, and the computer program includes program codes for performing the methods illustrated in the flowcharts. In such embodiments, the computer program may be downloaded and installed from a network via the communication device 609, or installed from storage device 608 or from ROM 602. The computer program, when executed by the processing device 601, performs the above-described functions defined in the method according to any of embodiments of the present disclosure.

Note that the above computer-readable medium may be a computer-readable signal medium or a computer-readable storage medium or any combination thereof. The computer-readable storage medium can be, for example, but is not limited to an electronic, magnetic, optical, electromagnetic, infrared, or semiconductor system, apparatus, or device, or any combination thereof. More specific examples of computer-readable storage media may include, but are not limited to: an electrical connection having one or more wires, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. According to the present disclosure, a computer-readable storage medium may be any tangible medium that contains or stores a program that can be used by or in connection with an instruction execution system, apparatus, or device. According to the present disclosure, a computer-readable signal medium may include a data signal propagated in baseband or propagated as part of a carrier wave and may carry computer-readable program codes. Such propagated data signal may take many forms, including but not limited to an electromagnetic signal, an optical signal, or any suitable combination thereof. The computer-readable signal medium may also be any computer-readable medium other than a computer-readable storage medium, and can send, propagate, or transport the program for use by or in connection with the instruction execution system, apparatus, or device. The program codes embodied on the computer readable medium may be transmitted over any suitable medium including, but not limited to an electric wire, an optic cable, a radio frequency (RF), and the like, or any suitable combination thereof.

In some embodiments, clients and servers may perform communication using any currently known or future developed network protocol, such as HyperText Transfer Protocol (HTTP), and may be interconnected with any form or medium of digital data communication (e.g. a communication network). Examples of communication networks include local area networks ("LAN"), wide area networks ("WAN"), internetworks (e.g. the Internet), and peer-to-peer networks (e.g. the ad hoc peer-to-peer network), as well as any network currently known or developed in the future.

The computer-readable medium may be embodied in the electronic device, or may be separate from the electronic device and not incorporated into the electronic device.

The computer-readable medium carries one or more programs that, when executed by the electronic device, cause the electronic device to: encode training speech data according to the encoder to obtain an acoustic vector sequence corresponding to the training speech data, wherein the acoustic vector sequence includes an acoustic vector of each audio frame of the training speech data; obtain an information amount sequence corresponding to the training speech data based on the acoustic vector sequence and the CIF prediction sub-model, the information amount sequence containing a target information amount of each audio frame; obtain a target probability sequence based on the acoustic vector sequence and the CTC prediction sub-model, wherein the target probability sequence includes a target text probability corresponding to each audio frame; determine a target loss of the speech recognition model based on the information amount sequence and the target probability sequence; and update, in response to an updating condition being satisfied, a model parameter of the speech recognition model based on the target loss.

Alternatively, the computer-readable medium carries one or more programs which, when executed by the electronic device, cause the electronic device to: receive speech data to be recognized; input the speech data into a speech recognition model to obtain a target text corresponding to the speech data, wherein the speech recognition model is obtained by being trained based on the method for training the speech recognition model according to any of the above embodiments.

Computer program codes for carrying out operations of the present disclosure may be written in one or more programming languages, including but is not limited to object-oriented programming languages, such as Java, smalltalk, C++, and conventional procedural programming languages, such as the "C" language or similar programming languages, or combinations thereof. The program codes may be executed entirely on a user computer, executed partially on a user computer, executed as a stand-alone software package, or executed partially on a user computer and partially on a remote computer, or executed entirely on a remote computer or server. In the case of a remote computer involved, the remote computer may be connected to the user computer through any kind of network, including a local area network (LAN) or a wide area network (WAN), or may be connected to an external computer (e.g., through the Internet using an Internet service provider).

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of codes, which includes one or more executable instructions for implementing specified logical functions. It should also be noted that in some alternative implementations, the functions indicated in the blocks may occur out of the order noted in the figures. For example, two consecutive blocks may in fact be executed substantially in parallel, or they may sometimes be executed in the reverse order, depending on the functionality involved. It is also noted that each block of the block diagrams and/or flowchart illustrations, and combinations of blocks in the block diagrams and/or flowchart illustrations, can be implemented by special purpose hardware-based systems which carry out the specified functions or operations, or combinations of special purpose hardware and computer instructions.

The modules described in connection with the embodiments of the present disclosure may be implemented in software or hardware. The name of a module does not constitute a definition of the module itself under certain circumstances. For example, an encoding module can also be described as "a module configured to encode training speech data based on the encoder to obtain an acoustic vector sequence corresponding to the training speech data".

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), System on Chip (SOCs), Complex Programmable Logic Devices (CPLDs), etc.

In the context of the invention, a machine-readable medium can be a tangible medium that can contain or store a program for use by or in connection with an instruction execution system, device, or apparatus. The machine-readable medium may be a machine-readable signal medium or a machine-readable storage medium. The machine-readable medium may include, but is not limited to, an electronic, magnetic, optical, electromagnetic, infrared, or semiconductor system, device, or apparatus, or any suitable combination thereof. More specific examples of a machine-readable storage medium may include an electrical connection based on one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

According to one or more embodiments of the present disclosure, Example 1 provides a method for training a speech recognition model. The speech recognition model including an encoder, a Continuous Integrate-and-Fire (CIF) prediction sub-model and a Connectionist temporal classification (CTC) prediction sub-model. The method includes:
  encoding training speech data based on the encoder to obtain an acoustic vector sequence corresponding to the training speech data, the acoustic vector sequence including an acoustic vector of each audio frame of the training speech data;
  obtaining an information amount sequence corresponding to the training speech data based on the acoustic vector sequence and the CIF prediction sub-model, the information amount sequence containing a target information amount of each audio frame;
  obtaining a target probability sequence based on the acoustic vector sequence and the CTC prediction sub-model, the target probability sequence includes a target text probability corresponding to each audio frame;
  determining a target loss of the speech recognition model based on the information amount sequence and the target probability sequence; and
  updating, in response to an updating condition being satisfied, a model parameter of the speech recognition model based on the target loss.

According to one or more embodiments of the present disclosure, Example 2 provides the method for Example 1. The obtaining the information amount sequence corresponding to the training speech data based on the acoustic vector sequence and the CIF prediction sub-model includes:
  inputting the acoustic vector sequence into the CIF prediction sub-model to obtain a predictive information amount sequence, the predictive information amount sequence including a predictive information amount corresponding to each audio frame; and normalizing the predictive information amount corresponding to each audio frame in the predictive information amount sequence to obtain a target information amount corresponding to each audio frame so as to obtain the information amount sequence.

According to one or more embodiments of the present disclosure, Example 3 provides the method for Example 1. The obtaining the target probability sequence based on the acoustic vector sequence and the CTC prediction sub-model includes:

inputting the acoustic vector sequence into the CTC prediction sub-model to obtain a predictive probability distribution corresponding to each audio frame;

determining, for each audio frame, a sum of probabilities corresponding to a target character in the predictive probability distribution corresponding to the audio frame as a text probability of the audio frame; and normalizing the text probability corresponding to each audio frame to obtain a target text probability corresponding to the audio frame so as to obtain the target probability sequence.

According to one or more embodiments of the present disclosure, Example 4 provides the method for Example 1. The determining the target loss of the speech recognition model based on the information amount sequence and the target probability sequence includes:

determining a distance loss corresponding to the speech recognition model based on a target distance between the information amount sequence and the target probability sequence; and determining the target loss based on the distance loss and a predictive loss of the speech recognition model, wherein the predictive loss includes one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

According to one or more embodiments of the present disclosure, example 5 provides the method for Example 4. The determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;

$P_u$ represents a target text probability corresponding to a $u^{th}$ audio frame;

$\alpha_u$ represents a target information amount corresponding to the $u^{th}$ audio frame.

According to one or more embodiments of the present disclosure, Example 6 provides a speech recognition method. The speech recognition method includes:

receiving speech data to be recognized; and inputting the speech data into a speech recognition model to obtain a target text corresponding to the speech data, wherein the speech recognition model is obtained by being trained based on method for training the speech recognition model according to any one of examples 1 to 5.

According to one or more embodiments of the present disclosure, Example 7 provides an device for training a speech recognition model. The speech recognition model including an encoder, a Continuous Integrate-and-Fire (CIF) prediction sub-model and a Connectionist temporal classification (CTC) prediction sub-model. The device includes:

an encoding module configured to encode training speech data based on the encoder to obtain an acoustic vector sequence corresponding to the training speech data, the acoustic vector sequence including an acoustic vector of each audio frame of the training speech data;

a first processing module configured to obtain an information amount sequence corresponding to the training speech data based on the acoustic vector sequence and the CIF prediction sub-model, the information amount sequence containing a target information amount of each audio frame;

a second processing module configured to obtain a target probability sequence based on the acoustic vector sequence and the CTC prediction sub-model, wherein the target probability sequence includes a target text probability corresponding to each audio frame;

a first determination module configured to determine a target loss of the speech recognition model based on the information amount sequence and the target probability sequence; and an updating module configured to update, in response to an updating condition being satisfied, a model parameter of the speech recognition model based on the target loss.

According to one or more embodiments of the present disclosure, Example 8 provides a speech recognition device. The speech recognition device includes:

a receiving module configured to receive speech data to be recognized;

a second determination module configured to determine a target text corresponding to the speech data based on the speech data and a speech recognition model, wherein the speech recognition model is obtained by being trained based on the method for training the speech recognition model according to any one of Examples 1-5.

According to one or more embodiments of the present disclosure, Example 9 provides a computer-readable medium. The computer-readable medium has stored thereon a computer program that, when executed by a processing device, implements steps of the method according to any of of Examples 1-6.

According to one or more embodiments of the present disclosure, Example 10 provides an electronic device. The electronic device includes:

a storage device on which a computer program is stored; and a processing device configured to execute the computer program in the storage device to implements steps of the method according to any of Examples 1-6.

The foregoing description is only illustrative of the preferred embodiments of the present disclosure and of the principles of the technology employed. It will be understood by a person skilled in the art that the scope of disclosure referred to in this disclosure is not limited to technical solutions formed by the particular combinations of features described above, but is intended to cover technical solutions formed by any other combinations of features described above or their equivalents without departing from the spirit of the present disclosure, for example, a technical solution formed by replacement of the above-mentioned features with the technical features disclosed in the present disclosure (but not limited to thereto) having similar functions or vice versa.

Further, while operations are depicted in a particular order, this should not be understood to require that the operations be performed in the particular order shown or in a sequential order. Under certain circumstances, multitasking and parallel processing may be advantageous. As such, specific implementation details have been included in the above discussion, but these should not be construed as limiting the scope of the present disclosure. Certain features that are described in the context of separate embodiments may also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims. With respect to the apparatus in the above-described embodiments, the specific manner in which the various modules perform operations has been described in detail in connection with the embodiments of the method and will not be described in detail herein.

What is claimed is:

1. A method for training a speech recognition model, the speech recognition model comprising an encoder, a Continuous Integrate-and-Fire (CIF) prediction sub-model and a Connectionist temporal classification (CTC) prediction sub-model, the method comprising:
    encoding training speech data based on the encoder to obtain an acoustic vector sequence corresponding to the training speech data, the acoustic vector sequence comprising an acoustic vector of each audio frame of the training speech data;
    obtaining an information amount sequence corresponding to the training speech data based on the acoustic vector sequence and the CIF prediction sub-model, the information amount sequence containing a target information amount of each audio frame, wherein the target information amount of each audio frame is used to characterize an amount of information contained in the audio frame;
    obtaining a target probability sequence based on the acoustic vector sequence and the CTC prediction sub-model, the target probability sequence comprising a target text probability corresponding to each audio frame, wherein the target text probability corresponding to each audio frame is a sum of probabilities for real characters among a plurality of recognized characters corresponding to the audio frame;
    determining a target loss of the speech recognition model based on the information amount sequence and the target probability sequence; and
    updating, in response to an updating condition being satisfied, a model parameter of the speech recognition model based on the target loss, and performing speech recognition on speech data to be recognized using the speech recognition model with the updated model parameter to output a target text corresponding to the speech data;
    wherein said determining the target loss of the speech recognition model based on the information amount sequence and the target probability sequence comprises:
        determining a distance loss corresponding to the speech recognition model based on a target distance between the information amount sequence and the target probability sequence; and
        determining the target loss based on the distance loss and a predictive loss of the speech recognition model.

2. The method according to claim 1, wherein said obtaining the information amount sequence corresponding to the training speech data based on the acoustic vector sequence and the CIF prediction sub-model comprises:
    inputting the acoustic vector sequence into the CIF prediction sub-model to obtain a predictive information amount sequence, the predictive information amount sequence comprising a predictive information amount corresponding to each audio frame; and
    normalizing the predictive information amount corresponding to each audio frame in the predictive information amount sequence to obtain a target information amount corresponding to each audio frame so as to obtain the information amount sequence.

3. The method according to claim 1, wherein said obtaining the target probability sequence based on the acoustic vector sequence and the CTC prediction sub-model comprises:
    inputting the acoustic vector sequence into the CTC prediction sub-model to obtain a predictive probability distribution corresponding to each audio frame;
    determining, for each audio frame, the sum of the probabilities corresponding to the real characters in the predictive probability distribution corresponding to the audio frame as a text probability of the audio frame; and
    normalizing the text probability corresponding to each audio frame to obtain a target text probability corresponding to the audio frame so as to obtain the target probability sequence.

4. The method according to claim 1,
    wherein the predictive loss comprises one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

5. The method according to claim 4, wherein said determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;
$P_u$ represents a target text probability corresponding to a $u^{th}$ audio frame;
$\alpha_u$ represents a target information amount corresponding to the $u^{th}$ audio frame.

6. A method for speech recognition, the method comprising:
  receiving speech data to be recognized; and
  inputting the speech data into a speech recognition model to obtain a target text corresponding to the speech data, the speech recognition model comprising an encoder, a Continuous Integrate-and-Fire (CIF) prediction sub-model and a Connectionist temporal classification (CTC) prediction sub-model, wherein the speech recognition model is obtained by being trained based on operations of
  encoding training speech data based on the encoder to obtain an acoustic vector sequence corresponding to the training speech data, the acoustic vector sequence comprising an acoustic vector of each audio frame of the training speech data;
  obtaining an information amount sequence corresponding to the training speech data based on the acoustic vector sequence and the CIF prediction sub-model, the information amount sequence containing a target information amount of each audio frame, wherein the target information amount of each audio frame is used to characterize an amount of information contained in the audio frame;
  obtaining a target probability sequence based on the acoustic vector sequence and the CTC prediction sub-model, the target probability sequence comprising a target text probability corresponding to each audio frame, wherein the target text probability corresponding to each audio frame is indicative of a sum of probabilities for real characters among a plurality of recognized characters corresponding to the audio frame;
  determining a target loss of the speech recognition model based on the information amount sequence and the target probability sequence; and
  updating, in response to an updating condition being satisfied, a model parameter of the speech recognition model based on the target loss;
  wherein said determining the target loss of the speech recognition model based on the information amount sequence and the target probability sequence comprises:
    determining a distance loss corresponding to the speech recognition model based on a target distance between the information amount sequence and the target probability sequence; and
    determining the target loss based on the distance loss and a predictive loss of the speech recognition model.

7. The method according to claim 6, wherein said obtaining the information amount sequence corresponding to the training speech data based on the acoustic vector sequence and the CIF prediction sub-model comprises:
  inputting the acoustic vector sequence into the CIF prediction sub-model to obtain a predictive information amount sequence, the predictive information amount sequence comprising a predictive information amount corresponding to each audio frame; and
  normalizing the predictive information amount corresponding to each audio frame in the predictive information amount sequence to obtain a target information amount corresponding to each audio frame so as to obtain the information amount sequence.

8. The method according to claim 6, wherein said obtaining the target probability sequence based on the acoustic vector sequence and the CTC prediction sub-model comprises:
  inputting the acoustic vector sequence into the CTC prediction sub-model to obtain a predictive probability distribution corresponding to each audio frame;
  determining, for each audio frame, the sum of the probabilities corresponding to the real characters in the predictive probability distribution corresponding to the audio frame as a text probability of the audio frame; and
  normalizing the text probability corresponding to each audio frame to obtain a target text probability corresponding to the audio frame so as to obtain the target probability sequence.

9. The method according to claim 6,
  wherein the predictive loss comprises one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

10. The method according to claim 9, wherein said determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;
$P_u$ represents a target text probability corresponding to a $u^{th}$ audio frame;
$\alpha_u$ represents a target information amount corresponding to the $u^{th}$ audio frame.

11. An electronic device, comprising:
  a storage device on which a computer program is stored; and
  a processing device configured to execute the computer program in the storage device to implements steps of the method according to claim 6.

12. The electronic device to claim 11, wherein said obtaining the information amount sequence corresponding to the training speech data based on the acoustic vector sequence and the CIF prediction sub-model comprises:
  inputting the acoustic vector sequence into the CIF prediction sub-model to obtain a predictive information amount sequence, the predictive information amount sequence comprising a predictive information amount corresponding to each audio frame; and
  normalizing the predictive information amount corresponding to each audio frame in the predictive information amount sequence to obtain a target information amount corresponding to each audio frame so as to obtain the information amount sequence.

13. The electronic device according to claim 11, wherein said obtaining the target probability sequence based on the acoustic vector sequence and the CTC prediction sub-model comprises:

inputting the acoustic vector sequence into the CTC prediction sub-model to obtain a predictive probability distribution corresponding to each audio frame;
determining, for each audio frame, the sum of the probabilities of the real characters in the predictive probability distribution corresponding to the audio frame as a text probability of the audio frame; and
normalizing the text probability corresponding to each audio frame to obtain a target text probability corresponding to the audio frame so as to obtain the target probability sequence.

14. The electronic device according to claim 11, wherein the predictive loss comprises one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

15. The electronic device according to claim 14, wherein said determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;
$P_u$ represents a target text probability corresponding to a $u^{th}$ audio frame;
$\alpha_u$ represents a target information amount corresponding to the $u^{th}$ audio frame.

16. A non-transitory computer-readable medium having stored thereon a computer program, wherein the computer program, when executed by a processing device, implements training a speech recognition model, the speech recognition model comprising an encoder, a Continuous Integrate-and-Fire (CIF) prediction sub-model and a Connectionist temporal classification (CTC) prediction sub-model, the training comprising the operations of:
encoding training speech data based on the encoder to obtain an acoustic vector sequence corresponding to the training speech data, the acoustic vector sequence comprising an acoustic vector of each audio frame of the training speech data;
obtaining an information amount sequence corresponding to the training speech data based on the acoustic vector sequence and the CIF prediction sub-model, the information amount sequence containing a target information amount of each audio frame, wherein the target information amount of each audio frame is used to characterize an amount of information contained in the audio frame;
obtaining a target probability sequence based on the acoustic vector sequence and the CTC prediction sub-model, the target probability sequence comprising a target text probability corresponding to each audio frame, wherein the target text probability corresponding to each audio frame is indicative of a sum of probabilities for real characters among a plurality of recognized characters corresponding to the audio frame;
determining a target loss of the speech recognition model based on the information amount sequence and the target probability sequence; and
updating, in response to an updating condition being satisfied, a model parameter of the speech recognition model based on the target loss, and performing speech recognition on speech data to be recognized using the speech recognition model with the updated model parameter to output a target text corresponding to the speech data;
wherein said determining the target loss of the speech recognition model based on the information amount sequence and the target probability sequence comprises:
determining a distance loss corresponding to the speech recognition model based on a target distance between the information amount sequence and the target probability sequence; and
determining the target loss based on the distance loss and a predictive loss of the speech recognition model.

17. The non-transitory computer-readable medium according to claim 16, wherein said obtaining the information amount sequence corresponding to the training speech data based on the acoustic vector sequence and the CIF prediction sub-model comprises:
inputting the acoustic vector sequence into the CIF prediction sub-model to obtain a predictive information amount sequence, the predictive information amount sequence comprising a predictive information amount corresponding to each audio frame; and
normalizing the predictive information amount corresponding to each audio frame in the predictive information amount sequence to obtain a target information amount corresponding to each audio frame so as to obtain the information amount sequence.

18. The non-transitory computer-readable medium according to claim 16, wherein said obtaining the target probability sequence based on the acoustic vector sequence and the CTC prediction sub-model comprises:
inputting the acoustic vector sequence into the CTC prediction sub-model to obtain a predictive probability distribution corresponding to each audio frame;
determining, for each audio frame, the sum of the probabilities corresponding to the real characters in the predictive probability distribution corresponding to the audio frame as a text probability of the audio frame; and
normalizing the text probability corresponding to each audio frame to obtain a target text probability corresponding to the audio frame so as to obtain the target probability sequence.

19. The non-transitory computer-readable medium according to claim 16,
wherein the predictive loss comprises one or more of a number loss and a cross entropy loss that correspond to the CIF prediction sub-model and an alignment loss corresponding to the CTC prediction sub-model, and the number loss corresponding to the CIF prediction sub-model is determined based on a number of predictive characters output by the CIF prediction sub-model and a number of characters of a training text corresponding to the training speech data.

20. The non-transitory computer-readable medium according to claim 19, wherein said determining the distance loss corresponding to the speech recognition model based on the target distance between the information amount sequence and the target probability sequence is performed by a formula of:

$$L_{KL} = \sum_u P_u * \log(P_u/\alpha_u)$$

wherein $L_{KL}$ represents the distance loss;
$P_u$ represents a target text probability corresponding to a $u^{th}$ audio frame;
$\alpha_u$ represents a target information amount corresponding to the $u^{th}$ audio frame.

* * * * *